United States Patent [19]
Hake

[11] Patent Number: 6,104,694
[45] Date of Patent: *Aug. 15, 2000

[54] REPRODUCTION OR RECORDING DEVICE FOR OPTICAL RECORDING MEDIA

[75] Inventor: Martin Hake, Villingen-Schwenningen, Germany

[73] Assignee: Deutsche Thomson Brandt GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/942,753

[22] Filed: Oct. 2, 1997

[30] Foreign Application Priority Data

Oct. 16, 1996 [DE] Germany ............ 196 42 716

[51] Int. Cl.$^7$ .................................................. G11B 23/30
[52] U.S. Cl. ........................................................... 369/263
[58] Field of Search ................... 369/44.27, 44.39, 369/75.2, 109, 258, 264, 270, 263, 271, 286, 289, 290, 292, 44.22, 275.1, 73, 32; 360/133, 132

[56] References Cited

U.S. PATENT DOCUMENTS

| | | |
|---|---|---|
| 3,800,325 | 3/1974 | O'Brien . |
| 3,975,768 | 8/1976 | Jacques et al. . |
| 4,370,687 | 1/1983 | Shiraishi et al. . |
| 5,034,933 | 7/1991 | Fujisawa et al. ............ 369/13 |
| 5,132,947 | 7/1992 | Kameda et al. ............ 369/32 |
| 5,167,996 | 12/1992 | Kurisu et al. ............... 428/64 |
| 5,218,599 | 6/1993 | Tsuyoshi et al. ........... 386/103 |
| 5,226,033 | 7/1993 | Takahashi ................. 369/290 |
| 5,263,016 | 11/1993 | Minoda et al. ............ 369/286 |
| 5,311,494 | 5/1994 | Sugita et al. ............. 369/100 |
| 5,351,159 | 9/1994 | Dodt et al. ............... 360/132 |
| 5,526,328 | 6/1996 | Oshima et al. ............ 369/13 |
| 5,555,537 | 9/1996 | Imaino et al. ........... 369/109 |
| 5,646,934 | 7/1997 | Mizuno et al. ........... 369/290 |

OTHER PUBLICATIONS

Patent Abstracts of Japan, vol. 095, No. 002, Mar. 31, 1995 (Fujitsu General Ltd.) Nov. 4, 1994.
European Search Report dated Nov. 24, 1998.

*Primary Examiner*—David L. Ometz
*Assistant Examiner*—Angel Castro
*Attorney, Agent, or Firm*—Joseph S. Tripoli; Frederick A. Wein

[57] ABSTRACT

The invention relates to a reproduction or recording device for optical recording media with which information, data or control signals are reproduced or recorded without an optical recording medium provided as an exchangeable data medium, such as, for example, a CD or a disk for recording information, being inserted in the device and without a special electronic memory being present. According to the invention, a holding apparatus which is provided in the reproduction or recording device for optical recording media for the purpose of holding the exchangeable data medium is designed as an optical recording medium. The holding apparatus, which is driven by the disk turntable even when there is no optical recording medium inserted, is designed as an optical recording medium. The holdin apparatus has an optical recording medium which is designated as puck CD and, in contrast to the exchangeable data medium, is a component part of the device. It can be used for the reproduction or recording of information or data. Operating instructions or functional demonstrations of the device are preferably stored such that they cannot be lost. Application is possible in all reproduction or recording devices for optical recording media.

5 Claims, 4 Drawing Sheets

REPRODUCTION OR RECORDING DEVICE FOR OPTICAL RECORDING MEDIA

BACKGROUND

The invention relates to a reproduction or recording device for optical recording media with which information, data or control signals are reproduced or recorded without an optical recording medium provided as a exchangeable data medium, such as, for example, a CD or a disk for recording information, being inserted into the device and without a special electronic memory being present.

Reproduction devices for optical recording media, such as, for example, CD players, or CD-ROM drives and recording devices for optical recording media, such as, for example, minidisk recorders, with which information can be recorded, are generally known. Optical recording media are wafers, disks or else cards, on which information such as music, video, sound and text as well as data are stored or can be recorded and which are written to or scanned contactlessly, preferably using a laser. Irrespective of its function as a recording or reproduction medium, the optical recording medium provided for exchange or replacement is also referred to as a so-called exchangeable data medium. Reproduction and recording devices for optical recording media as well as corresponding exchangeable data medium are already widespread in private households and in the public domain. CD players, CD-ROM drives and videodisk players are sold via the trade, usually supported by advertising measures. While it is the norm in specialist shops for a customer to be given a presentation and explanation of the device together with its functions and advantages, a customer making a purchase in other trade facilities or starting up the device for the first time is generally directed to an extensive study of the operating instructions. If a device or specific functions of the device are not used over a relatively long period of time, they are forgotten and the operating instructions must be consulted again. Good advice is expensive when the operating instructions are mislaid or even lost, something which may even detract from taking pleasure in the device purchased. A recording device for optical recording media can be used to store information or data only when the operating functions required to carry out recording are known, the corresponding exchangeable data medium is present and a corresponding storage capacity is available.

SUMMARY OF THE INVENTION

The object of the invention, therefore, is to provide a reproduction or recording device for optical recording media which is suitable for the reproduction or, if appropriate, also for the recording of information or data without an exchangeable data medium, operating instructions or a special electronic circuit for information storage being present.

This object is achieved by means of the features specified in independent claims. Advantageous designs and developments are specified in dependent claims.

The invention is based on the fact that the reproduction or recording device for optical recording media contains in the device an information or data memory in which, for example, the operating instructions or other information or data are stored or can be stored. Such information may be, for example: an interactive automatic explanation of the device or components to be connected, a so-called equipment demo, equipment tests, customer or dealer information, advertising, equipment explanations which would otherwise have to be undertaken by the dealer, information for eliminating faults or setting equipment and information or data recorded by an operator of the device. For information storage, however, neither an exchangeable data medium to be inserted into the device nor a special electronic circuit is provided, yet the reproduction or recording of data or information or equipment demonstrations are nevertheless made possible.

According to the invention, a holding apparatus which is provided in the reproduction or recording device for optical recording media for the purpose of holding the exchangeable data medium is designed as an optical recording medium. In a CD player, such a holding apparatus is, for example, a so-called puck, with which the CD is held on the disk turntable. A holding apparatus corresponding to this puck is designed as an optical recording medium and is used as a memory for the abovementioned information or data. An optical recording medium which is not an exchangeable data medium but a fixed component part of the device is provided in the reproduction or recording device. Operating instructions stored on this optical recording medium cannot be lost and additional memory space is available in the recording device. The reproduction or recording device for optical recording media can also continue to be used without any restrictions for operation with exchangeable date media, since a functional element which is present in any case in the device is not changed or is changed only insignificantly with regard to its function for the exchangeable data medium.

The scanning or recording system which is provided in the reproduction or recording device for the exchangeable data medium is preferably likewise used for the reproduction or recording of information or data with the optical recording medium installed in the device.

In reproduction or recording devices for optical recording media, it is necessary to fix the disk on the disk turntable by means of a holding apparatus. In numerous devices, this is done using a magnet, which is fastened in a plastic part and placed onto the recording medium from above. This holding means is referred to as a so-called puck. The puck or the plastic part lies directly on the disk turntable when, for example, there is no CD inserted in the device. As a result, the scanning system does not find a recording medium and, after several attempts to focus the light beam on the recording medium, the device signals that there is no CD inserted.

According to the invention, the holding apparatus or the puck, which is driven by the disk turntable even when there is no optical recording medium inserted, is designed as an optical recording medium. The holding apparatus has an optical recording medium which, in contrast to the exchangeable data medium, is a component part of the device. A side, facing the scanning or recording system, of the holding apparatus whose area is, if appropriate, of enlarged design, is preferably designed as an optical recording medium. The scanning or recording system present in the reproduction or recording device is then used both for optical recording media provided as exchangeable data media and for the optical recording medium provided as a component part of the device.

The optical recording medium which is provided in connection with the holding apparatus or in connection with the puck is joined to the holding apparatus by means of an adhesive bond, for example, or a latching connection is provided between the puck and optical recording medium. The optical recording medium is therefore also referred to as a puck CD. However, it is also possible to select any other type of connection or to design the holding apparatus as an integral optical recording medium.

In order to be able to use the scanning or recording system present in the device, the diameter of the puck CD is preferably matched to the reproduction or recording region of the reproduction or recording device. That area of the holding apparatus which is provided as optical recording medium is read by the scanning device or information or data are stored by means of a recording system. The reading or recording of information or data is preferably carried out when an optical recording medium provided as exchangeable data medium is not inserted in the device. The puck CD is then brought into a position with respect to the scanning or recording system which is analogous to the customary position of the exchangeable data medium in the reproduction or recording device. However, the application is not restricted to such a design since it is possible to read from or write to the puck CD even with the exchangeable data medium inserted, for example using a second scanning or recording system.

The optical recording medium provided as component part of the device or the puck CD is preferably a memory for the reproduction or recording of information or data of the type specified above. No additional electronic memory is required in the reproduction or recording device and it is nevertheless possible to reproduce acoustic, pictorial or functional information, such as, for example, a spoken version of the operating instructions, a demonstration of the functions of the device, advertising, music, etc. Different language versions can also be stored on the recording medium, with the result that it is possible to use one version of the recording medium for different countries. Subcode information stored on the recording medium can be used to display text or graphics on a display or screen of the device or of a connected device. The device can explain itself and the dealer would require less time to explain the functions of the device. Information for eliminating errors or for eliminating incorrect settings may be provided. Devices which are equipped with such information means also enable somebody who cannot read or who has no desire to read written operating instructions to become acquainted with all the functions of the device. The functions of the device can also be checked without an exchangeable data medium. It is possible to create an interactive system which affords an operator the possibility, by way of prompts which are stored as spoken information on the recording medium, of actuating keys on the device which then influence the progression of operation or of the desired function. It is thus possible to reinforce the learning effect or to communicate to the operator confirmation that the previously communicated information has been understood correctly. It is furthermore possible to accommodate on the puck CD information and music which give the operator an explanation of the setting and connection of the loudspeakers, for example. Multi-channel sound systems, in particular, can be set in an optimum manner thereby. Depending on how detailed and comprehensive the information on the recording medium is, it is possible to replace the customary operating instructions. Operating instructions which are installed in the device in this way cannot be lost. It is then no longer possible for the user to mislay or lose the operating instructions and thus to lose the exact description of the device and its functions.

Furthermore, the puck CD may be a memory for the recording and reproduction of information or data. The puck CD is then formed by an optical recording medium which can be written to once or many times. It is then possible to store information or data without a memory circuit being additionally required in the device. In this design, the holding apparatus which is designed as an optical recording medium can be used as an individual information or data memory.

Reproduction or recording devices for optical recording media are, for example, CD players, so-called WORM devices, minidisk playback and recording devices, videodisk playback and recording devices, card readers, CD-ROM drives, DVD playback or recording devices and the like. As this enumeration already shows, the field of application of the invention is not restricted by the type of optical recording medium.

The optical recording medium which is provided as component part of the device preferably has a format which corresponds to the format of the exchangeable data media. However, it is likewise advantageous to provide, for example, a smaller diameter in comparison with the exchangeable data medium, so that the inertia of the system is not significantly increased. The puck CD may, for example, have a format corresponding to a single CD or a form which deviates therefrom. The special feature of the recording medium consists, however, in the fact that the optical recording medium is provided as a component part of the device, in contrast to the exchangeable data medium. However, this does not preclude the situation where the optical recording medium which is provided as component part of the device is likewise exchangeable, such as, for example, in the case of a latching connection between the holding apparatus and the puck CD.

As soon as the turn-on button or a service switch has been actuated, reproduction or recording devices for optical recording media which are equipped with a puck CD reproduce information, data or control signals or record information without an optical recording medium provided as an exchangeable data medium, such as, for example, a CD or a disk for recording information, being inserted in the device and without a special electronic memory being present.

Moreover, it is an advantage of the devices equipped with a puck CD that the time taken to identify the state where there is no exchangeable data medium in the device is reduced. When there is no exchangeable data medium inserted in the device, the light beam is focused on the puck CD. Data read from the puck CD can then be used for a decision - no exchangeable data medium in the device. Multiple focusing is then unnecessary.

What are advantageous are operating instructions, installed in the device, for devices having numerous functions, such as, for example, a DVD playback and recording device, which is comparable with a known video recorder and has functions which go beyond the programming of a known video recorder, such as, for example, the observation of handling of different recording positions and numerous other functions which result from the application of an optical recording medium with a short access time and the digital signal processing.

The advantageous use of the puck CD in CD-ROM devices may also be mentioned. The other data format, the possibility of also installing in the device significantly higher volumes of data in the form of computer software, also exists in that case.

BRIEF DESCRIPTION OF THE DRAWINGS

The invention is explained in more detail below with reference to exemplary embodiments in drawings, in which.

DETAILED DESCRIPTION OF THE PREFERRED EMBODIMENT(S)

Figure 3:
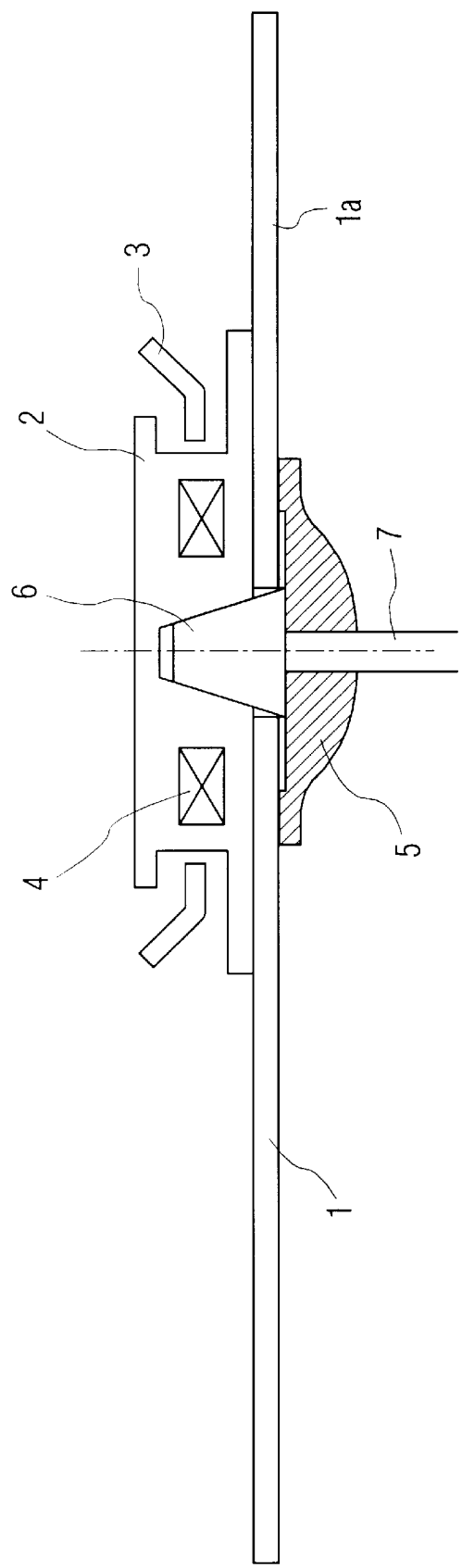
FIG. 3 shows a diagrammatic illustration of a known apparatus for exchangeable data media.

The reference symbols are used with corresponding meanings throughout the figures. FIG. 3 shows the diagrammatic illustration of a known apparatus of a reproduction or recording device for exchangeable data media 1, 1a, as is used in CD players, for example. The term exchangeable data media is not used only to identify the fact that the apparatus or the device is suitable both for a single CD 1a having a diameter of 80 mm and a customary CD 1 having a diameter of 120 mm. It is also intended to express the fact that the optical recording medium is provided, by simple handling, for the replacement or for the exchange of recording media of the same type but carrying different or the same information or data. This may be, for example, different CDs with classical or popular music or different feature films in the case of the DVD or video disk. Exchangeable date media are also optical recording media in the form of cards or optical recording media having the properties of a ROM or RAM.

The known apparatus, illustrated in FIG. 3, of a reproduction or recording device for exchangeable data media 1, 1a comprises a holding apparatus 2, which is formed by a so-called puck. The holding apparatus 2 is fastened together with a puck holder 3 in a device flap (not illustrated) or a housing (not illustrated) and contains a magnet 4. The magnet 4 is provided for clamping the exchangeable data medium 1, 1a on the disk turntable 5, which is arranged opposite the holding apparatus 2. In order to centre an exchangeable data medium 1, 1a on the disk turntable 5, the disk turntable 5 has a centring means 6, which is preferably formed by a cone or a spherical segment. The exchangeable data medium 1, 1a is placed onto the disk turntable 5, centred by means of the centring means 6 and held on the disk turntable 5 by means of the puck, which is provided as the holding apparatus 2. For this purpose, either the disk turntable 5 with the exchangeable data medium 1, 1a is brought to the holding apparatus 2 or the holding apparatus 2 is brought to the disk turntable 5. In this exemplary embodiment, the holding force for clamping the exchangeable data medium 1, 1a is generated by the magnet 4, which interacts with corresponding elements of the disk turntable 5, these elements not being illustrated. A scanning or recording system of the reproduction or recording device, which, as a rule, is arranged on the side of the disk turntable 5 likewise with regard to the exchangeable data medium 1, 1a is likewise not illustrated. The disk turntable 5, the exchangeable data medium 1, 1a and the holding apparatus 2 are driven in a known manner by a drive shaft 7 of a motor (not illustrated). It is necessary to clamp the exchangeable data medium 1, 1a on the disk turntable 5 since both the weight of the optical recording medium similar to a CD 1 and the bearing face on the disk turntable 5 are not sufficient to fix the recording medium or to cause it to revolve correspondingly in the case of rotating recording media.

Figure 4:
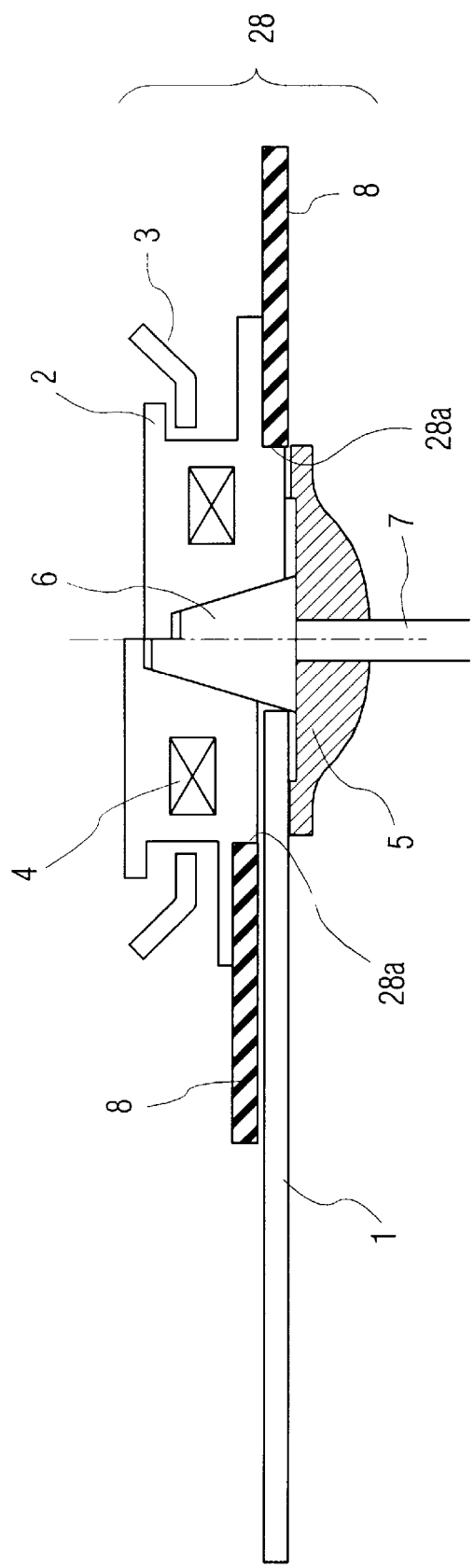
FIG. 4 shows a diagrammatic illustration of an apparatus with a puck CD and also with and without an exchangeable data medium.

According to the invention, the holding apparatus 2 or the so-called puck has, in accordance with FIG. 4, an optical recording medium 8, which is also designated as puck CD below. The designations optical recording medium 8 and puck CD are used synonymously below in order to enable a simpler differentiation between the optical recording medium provided as exchangeable data medium 1, 1a and the optical recording medium 8 provided as puck CD. In accordance with FIG. 4, the optical recording medium 8 forms, together with the holding apparatus 2, a structural unit 28 which is produced using a latching connection 280 in this design. In accordance with FIG. 1 and FIG. 2, the structural unit 28 can also be produced, for example, by means of an adhesive bond between the holding apparatus 2 and the puck CD. The puck CD thereby becomes an optical recording medium 8 which is provided as a component part of the reproduction or recording device. This means that an optical recording medium 8 is then present in the reproduction or recording device even though no optical recording medium provided as exchangeable data medium 1, 1a has been inserted in the device. This corresponds to the right-hand illustration in FIG. 4. In accordance with this part of FIG. 4, the puck CD is lowered to the level of the disk turntable 5, as a result of which the puck CD assumes a position corresponding to the exchangeable data medium 1, 1a with respect to a scanning or recording system (not illustrated) of the reproduction or recording device. The scanning or recording system can thereby be used, in an advantageous manner, both for the exchangeable data medium 1, 1a and for the puck CD. This correspondence is illustrated by comparing the right-hand illustration with the left-hand illustration in FIG. 4.

In accordance with a design which is not illustrated, it is also possible to bring the disk turntable 5 up to the holding apparatus 2 when there is no exchangeable data medium 1, 1a inserted. Since the disk turntable 5 and the scanning or recording system are, as a rule, arranged on a common chassis, corresponding positioning of the scanning or recording system with respect to the puck CD and with respect to the exchangeable data medium 1, 1a is also achieved with a design of this type.

Figure 1:
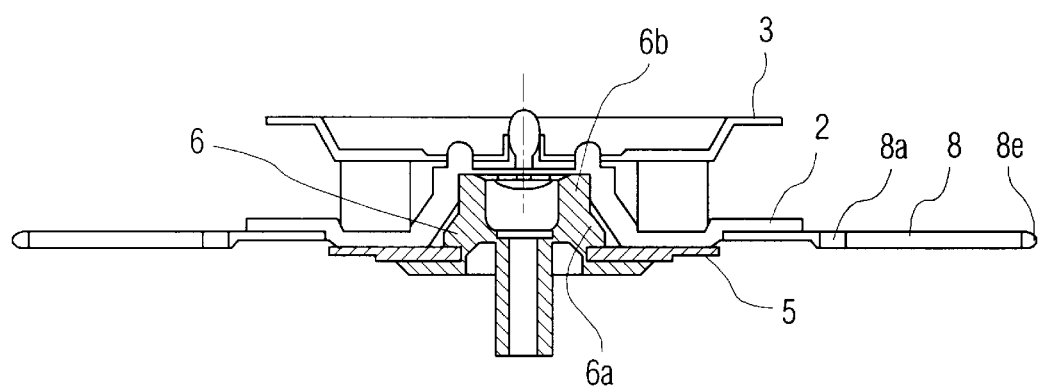
FIG. 1 shows a sketch of an apparatus with a puck CD.
Figure 2:
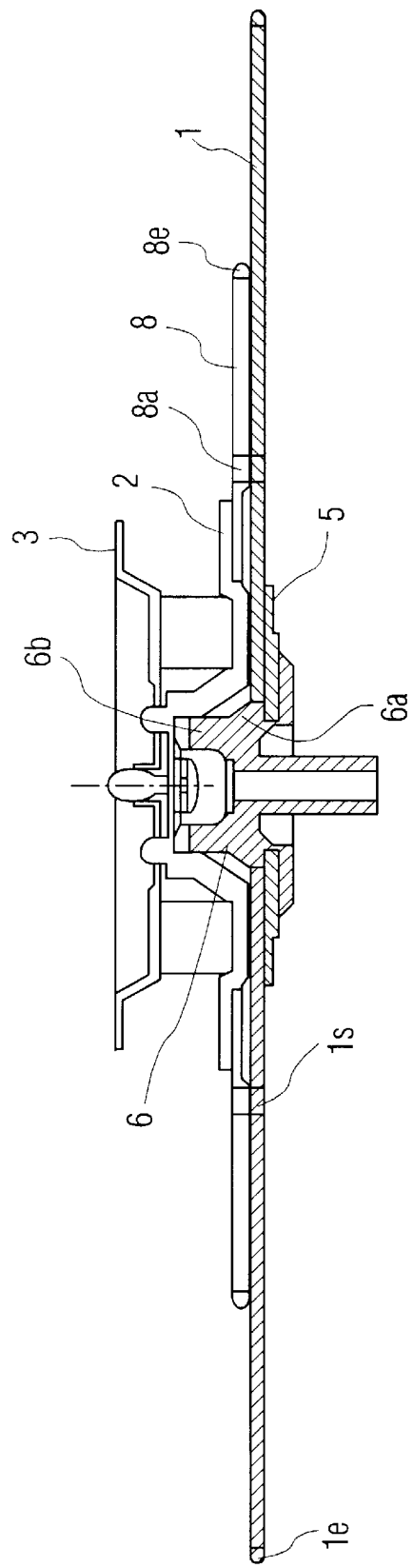
FIG. 2 shows a sketch of an apparatus with a puck CD and exchangeable data medium.

Figure and FIG. 2 show an exemplary embodiment with further details. FIG. 1 illustrates a holding apparatus 2 with a puck holder 3 which is mounted such that it can rotate in a housing (not illustrated), an optical recording medium 8, which is designed as a puck CD and has, corresponding to a CD, a start region 8a and an end region 8e, and a disk turntable 5 with a centring means 6 comprising a cone 6a and a cylinder 6b. In accordance with FIG. 1, an exchangeable data medium 1, 1a is not inserted in the reproduction or recording device, with the result that the holding apparatus 2 bears directly on the disk turntable 5. A disk turntable 5 which is caused to revolve then likewise drives the holding apparatus 2 with a holding force between the holding apparatus 2 and the disk turntable 5. In accordance with the abovementioned design, the holding force can be generated by magnetic means or by mechanical means, such as, for example, a spring. The puck CD, which is connected to the holding apparatus 2 by means of an adhesive bond, for example, is thereby also caused to revolve and is read from or written to by means of a scanning or recording system (not illustrated) analogously to an exchangeable data medium 1, 1a. In order to read or record data or information, the puck CD is centred with the holding apparatus 2 on the disk turntable 5. It is necessary to centre a rotating optical recording medium exactly for the purpose of reading or recording data or information in order that the scanning or writing beam can follow the track of the optical recording medium. According to the design in accordance with FIGS. 1 and 2, a centring means 6 comprising a cone 6a and a cylinder 6b is therefore provided. This centring means 6 advantageously ensures centring both of the holding apparatus 2 and of the exchangeable data media 1, 1a. While the holding apparatus 2 or the puck CD can be centred both with a cylindrical and with a conical centring means 6, it is not possible to centre the holding apparatus 2 with a cone 6a when the spacing from the disk turntable 5 has been increased due to the exchangeable data medium 1, 1a having been inserted. As illustrated in FIG. 2, the spacing between the holding apparatus 2 and the disk turntable 5 also results in a spacing between the conical region of the holding apparatus 2 and the conical region of the centring means 6. The exchangeable data medium 1 is centred with the conical region of the centring means 6 on the disk turntable 5. In order to avoid an unbalance by the holding apparatus 2, it is also necessary to centre the holding apparatus 2 with respect to the disk turntable 5 when the exchangeable data medium 1, 1a is inserted. In order to centre the holding apparatus 2 in spite of a spacing from the disk turntable 5 which has been increased by the exchangeable data medium 1, 1a, a starting cut, directed towards the holding apparatus 2, of the centring means 6 is therefore shaped as a cylinder 6b and the holding apparatus 2 has a receptacle corresponding to the shape and size of the centring means 6. In accordance with FIGS. 1 and 2, the puck CD has a smaller diameter than the exchangeable data medium 1, it being possible to regard a smaller diameter of the puck CD in comparison with the exchangeable date medium 1, with a correspondingly smaller memory space requirement, as advantageous on account of the smaller mass. Preferably, the diameter of the start region 8a of the puck CD is selected to correspond to a start region 1s of the exchangeable date medium 1, while the diameter of the end region 8e of the puck CD can be selected to deviate from the diameter of the end region 1e of the exchangeable data medium 1.

As soon as the turn-on button or a service switch has been actuated, reproduction or recording devices for optical recording media which are equipped with a puck CD reproduce information, data or control signals or record information without an optical recording medium which is provided as exchangeable data medium 1, 1a, such as, for example, a CD or a disk for recording information, being inserted in the device and without a special electronic memory being present.

Advertising or the operating instructions, for example, can be stored in spoken form on the puck CD. When somebody presses the play key without inserting a disk or an optical recording medium in the device, he is prompted in various languages to search for the title corresponding to his language, in order at that point to then receive the corresponding explanations regarding the device he has purchased, for example 1-German, 2-English, 3-French, 4-Italian or other. Music titles which show off specific audio qualities of the device to particularly good advantage, such as, for example, bass boost and surround-sound effects, may also be stored on the puck CD. If the device is part of a compact system, the information may also relate to the other parts of the device, such as tuner, tape or amplifier.

Devices equipped with a puck CD also enable people who cannot or have no wish to read included written operating instructions to become acquainted with all the functions of the device.

It is possible to create an interactive system with the puck CD. It is possible to afford the user the possibility, by way of prompts which are spoken on the CD, to press keys on the device which then influence the progression of the user information. It is thus possible to reinforce the learning effect or communicate to the user confirmation that the previously communicated information has been understood correctly.

The reproduction or recording device can also be designed in such a way that when there is no exchangeable data medium 1, 1a inserted and a key of the device is actuated, the function of this key is explained to the operator.

The subcode of a puck CD can be used to forward information to the microprocessor, which information is preferably forwarded to the user via an alphanumeric display. In the standard for CD recording, the channels R up to and including W are provided for such purposes in the subcode. The channel Q, on the other hand, is used, for example, to transmit the title number and corresponding time information. The transmission of information by way of the subcode also provides the possibility of transmitting control signals in addition to the acoustic information, which control signals control, for example, the backlighting of keys and symbols. This means can be used, for example, to prompt the user to press these keys or to communicate to him the function possessed by the correspondingly lit or flashing key.

By appropriately formulating the information, it is conceivable to record a universal puck CD which explains all the functions of the device to the user but points out that not every device can fulfil all of the functions. This would make it unnecessary to produce a new puck CD for each newly appearing device, thereby reducing the price of puck CDs given the rising number of puck CDs required for the manufacture of devices.

Depending on how detailed and comprehensive the information on the puck CD is, it can replace the written operating instructions. It is then no longer possible for the user to mislay or lose the operating instructions and thus to lose the accurate description of the device and its functions.

The puck CD can be used and configured in numerous different ways, with the result that the field of application and the implementation of the invention are not restricted to the exemplary embodiments specified here.

What is claimed is:

1. Reproduction or recording device comprising a holding apparatus for holding an exchangeable optical recording medium on a turntable of the reproduction or recording device wherein the holding apparatus comprises:

an optical recording medium for holding the exchangeable optical recording medium within the reproduction or recording device wherein the optical recording medium of the holding apparatus serve as an additional optical recording medium and wherein said additional optical recording medium is mounted at that side of the holding apparatus which faces a scanning or recording system of the reproduction or recording device for the exchangeable optical recording medium.

2. Device according to claim 1 wherein the holding apparatus and said additional optical recording medium are connected to one another by an adhesive bond.

3. Device according to claim 1 wherein the holding apparatus and said additional optical recording medium are connected to one another by a latching connection.

4. Device according to claim 1 wherein the additional optical recording medium has a format corresponding to said exchangeable optical recording medium.

5. A device according to claim 1 wherein the scanning or recording system present in the reproduction or recording device is used both for the exchangeable optical recording medium and for the additional optical recording medium.

\* \* \* \* \*